United States Patent
Yamazaki et al.

(10) Patent No.: US 6,169,868 B1
(45) Date of Patent: Jan. 2, 2001

(54) ELECTROPHOTOGRAPHIC APPARATUS

(75) Inventors: Koji Yamazaki, Odawara; Yuji Nakayama, Yokohama; Masaya Kawada; Hironori Ohwaki, both of Mishima, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/407,992

(22) Filed: Sep. 29, 1999

(30) Foreign Application Priority Data

Oct. 1, 1998 (JP) .................................................. 10-294415

(51) Int. Cl.$^7$ ..................................................... G03G 15/00
(52) U.S. Cl. ............................. 399/159; 399/170; 430/56
(58) Field of Search .................................... 399/159, 116, 399/411, 170–172; 430/56, 69

(56) References Cited

U.S. PATENT DOCUMENTS 5,206,686 * 4/1993 Fukui et al. .

FOREIGN PATENT DOCUMENTS 3-296073 12/1991 (JP) .

9-080855 3/1997 (JP) .

* cited by examiner

*Primary Examiner*—Richard Moses
(74) *Attorney, Agent, or Firm*—Fitzpatrick, Cella, Harper & Scinto

(57) ABSTRACT

The present invention relates to an electrophotographic apparatus in which maximum potential difference ΔVD (volt) in a potential of a dark portion of the electrostatic image in the longitudinal direction, maximum potential difference ΔVL in a potential of a light portion of the electrostatic image in the longitudinal direction, a value a (1/volt) represented by (variation amount in density, in the longitudinal direction, in the image formed by developing the light portion with the developing means)/(the maximum potential difference ΔVD) and a value b (1/volt) represented by (variation amount in density, in the longitudinal direction, in the image formed by developing the light portion with the developing means)/(the maximum potential difference ΔVL) satisfy a relation:

$$0.3 \leq a \times \Delta VD + b \times \Delta VL \leq 0.3$$

in which $100 \geq |\Delta VD| \geq 20$ and $100 \geq |\Delta VL| \geq 20$.

10 Claims, 7 Drawing Sheets

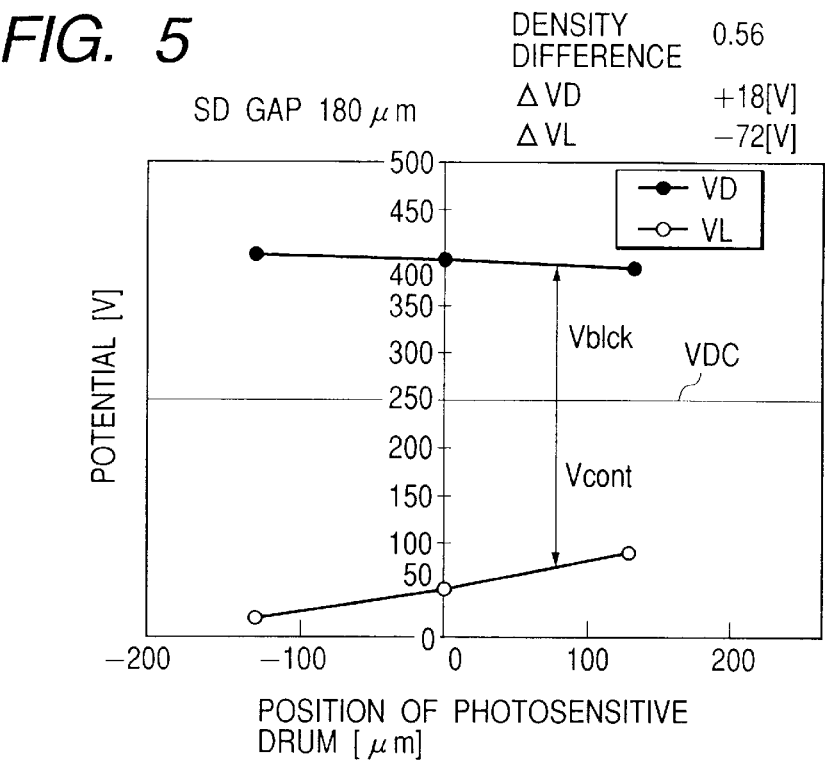
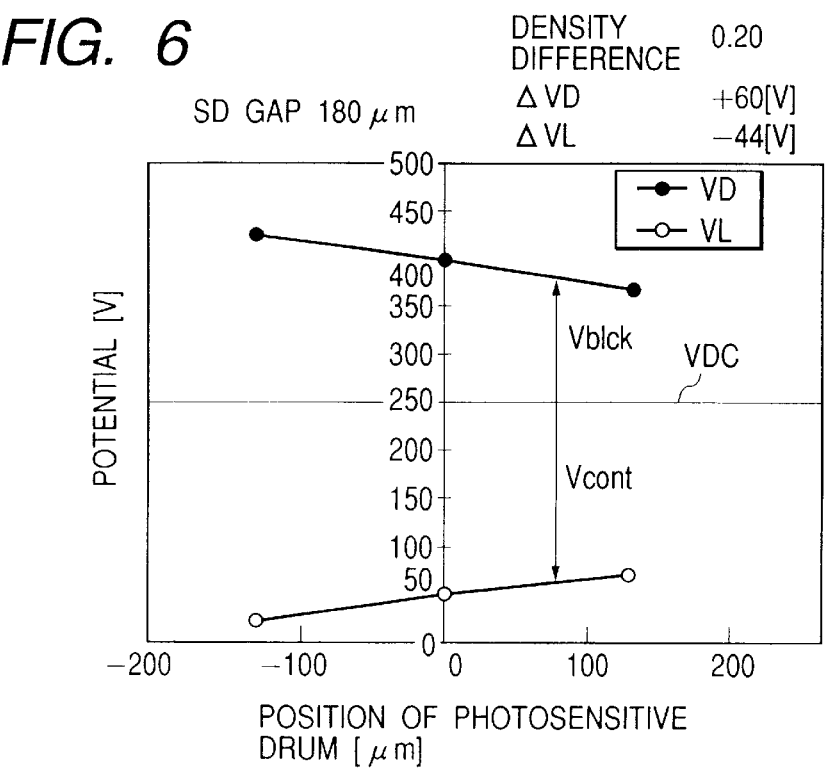

ELECTROPHOTOGRAPHIC APPARATUS

BACKGROUND OF THE INVENTION

1. Field of the Invention

The present invention relates to an electrophotographic apparatus for forming an electrostatic image by charging a photosensitive member, exposing the photosensitive member to light to form an electrostatic image, and developing such electrostatic image with developer.

2. Related Background Art

Recent development and spread of computers have increased the demand for printers as output means for the computers, and commercialized digital copying apparatus that combine of the functions of a printer with those of a conventional copying machine has been developed.

In such digital copying apparatus, the photosensitive material constituting the photosensitive layer of the electrophotographic photosensitive member (for example, a photosensitive drum) is composed of an inorganic photoconductive material such as selenium or amorphous silicon (a-Si), or an organic photoconductive material.

Amorphous silicon (a-Si), which is an inorganic photoconductive material, is used in the photosensitive member in the form of a non-monocrystalline deposition film principally composed of silicon and further containing hydrogen and a halogen such as fluorine or chlorine, and is proposed as a photosensitive member of high performance, high durability and no pollution, and is used in high-speed or large-scale apparatus for volume printing.

Non-monocrystalline silicon-based deposition film can be formed by many methods, such as sputtering by bombarding a target with an ion beam, thermal CVD by decomposing raw material gas with heat, photo CVD by decomposing raw material gas with light, and plasma CVD by decomposing raw material gas with plasma.

Among these methods, the plasma CVD (PCVD) method forms a deposition film on the surface of a desired substrate such as glass, quartz, heat-resistant plastic film, stainless steel or aluminum by generating glow discharge by a DC current or a high frequency current (RF or VHF) or microwave to form plasma and decomposing raw material gas with such plasma. This method and is practiced not only for the formation of a-Si deposition film for the electrophotographic photosensitive member but also for the formation of deposition films for other purposes, and various apparatus for this method are being proposed.

In a typical PCVD apparatus, the substrate is vertically set in a vertical reaction chamber, and the raw material gas is introduced to the vicinity of the substrate and is decomposed and deposited by plasma, and the used gas is discharged from a discharge aperture of the reaction chamber. The apparatus is principally classified into three types according to the position of discharge of the used gas.

Among these, a type which discharges used gas from the discharge aperture at the lateral wall of the reaction chamber and a type which discharges used gas from the discharge aperture provided in the upper part of the lateral wall of the reaction chamber are associated with a danger of intrusion of contaminants from the exterior into the reaction chamber through the discharge aperture and also with a drawback in that a highly pure a-Si deposition film, free from contaminant, cannot be obtained. On the other hand, a type which discharges used gas from the discharge aperture at the bottom of the reaction chamber is not associated with such drawback, but the obtained a-Si deposition film often has a slope in the vertical direction (longitudinal direction of photosensitive member) in certain characteristics such as the charging ability by the charger.

If the a-Si deposition film, or the a-Si photosensitive layer, has sloped characteristics, for example in the charging ability, in the longitudinal direction of the photosensitive member (namely in the vertical direction at the formation of the a-Si deposition film), the latent image formed by charging and image exposure becomes uneven. More specifically, a portion, having a higher charging ability, in the photosensitive layer shows a higher sensitivity to the image exposure, so that the latent image formed in such portion shows a higher potential contrast and is excessively developed. In a digital copying apparatus, the exposure amount per dot can be made uniform over the longitudinal direction of the photosensitive member, so that the influence of such sloped characteristics in the photosensitive layer is noticed conspicuously.

On the other hand, in order to meet recent requirements for finer image quality, a digital image is formed with a dot size of 60 to 70 $\mu$m by a digital process of 400 dpi or with a dot size of 40 to 50 $\mu$m by a digital process of 600 dpi, and, for this purpose, there are conducted improvements in the characteristics of the photosensitive member and reduction in the particle size of the developer, both in one-component developer and two-component developer. A developer of small particle size clearly shows the difference between the 400 dpi process and the 600 dpi process mentioned above and is very effective in improving the image quality. More specifically, as a toner of small particle size to be used in the developer, it is preferred that the toner be of a weight-averaged particle size of 6 to 9 $\mu$m, as measured for example by a Coulter counter, in order to precisely reproduce a dot of the latent image in the development operation while preventing fog.

There are known various developers according to these applications, but a one-component developer, consisting solely of toner, is being recently employed in a larger number of apparatus because it is not associated with the drawbacks of deterioration or replacement of the carrier and it allows the use of more compact developing unit.

In general, toner constituting a one-component developer is composed of resin particles of spherical or undefined shape with a weight-averaged particle size of 3 to 15 $\mu$m, containing magnetic substance and prepared by a synthetic method or a crushing method. For obtaining desired functions, there is externally added a powdered substance of sub micron order in size. The magnetic substance is composed for example of magnetite, while the resinous substance is composed for example of polystyrene, polyester or polybutadiene, and the externally added substance is composed for example of alumina, silica or strontium titanate.

For achieving higher image quality, Japanese Patent Application Laid-Open No. 9-80855 discloses a method of appropriately controlling the developing bias to eliminate the influence of unevenness in the characteristics of the photosensitive member, thereby improving the image quality, but still higher image quality is being sought.

In a digital copying apparatus, since the digital image is formed by a group of dots, such as those of about 40 $\mu$m by the 600 dpi digital process as explained in the foregoing, a deterioration in the reproducibility of the dot diameter in the developed image results in an unevenness in the image density, particularly in a halftone image.

In a low-speed printer and the like, it is possible to apply multi-level modulation to each dot thereby obtaining uniform image density or achieving improvement in the image gradation, but such a method is difficult to adopt in a high-speed printer because the digital process required therefor is cumbersome and difficult to adopt.

Also, the output image from the computer often contains fine hatchings, etc., and requires both a sufficiently high image density and a high sharpness. This requirement can be met for, the non-contact developing method by reducing the gap between the developing sleeve of the developing unit and the photosensitive member.

However, if the photosensitive layer of a photosensitive member shows a sloped distribution in the characteristics thereof, unevenness in the potential of the photosensitive layer results in an unevenness in the dot diameter after development, thereby causing unevenness in the density of the developed image.

SUMMARY OF THE INVENTION

An object of the present invention is to provide an electrophotographic apparatus capable of providing a uniform image density even in the presence of unevenness in charging or sensitivity characteristics of the photosensitive member.

Another object of the present invention is to provide an image forming apparatus capable of satisfactorily reproducing the diameter of dot constituting the image in the development of a digital latent image, thereby obtaining a halftone image of a uniform density without losing the density.

Still other objects of the present invention, and the features thereof, will become fully apparent from the following detailed description which is to be taken in conjunction with the attached drawings.

BRIEF DESCRIPTION OF THE DRAWINGS

FIGS. 5 and 6 are charts showing the mechanism of obtaining uniform image density in the present invention;

DETAILED DESCRIPTION OF THE PREFERRED EMBODIMENTS

Now the present invention will be clarified in detail by a preferred embodiment thereof.

Figure 1:
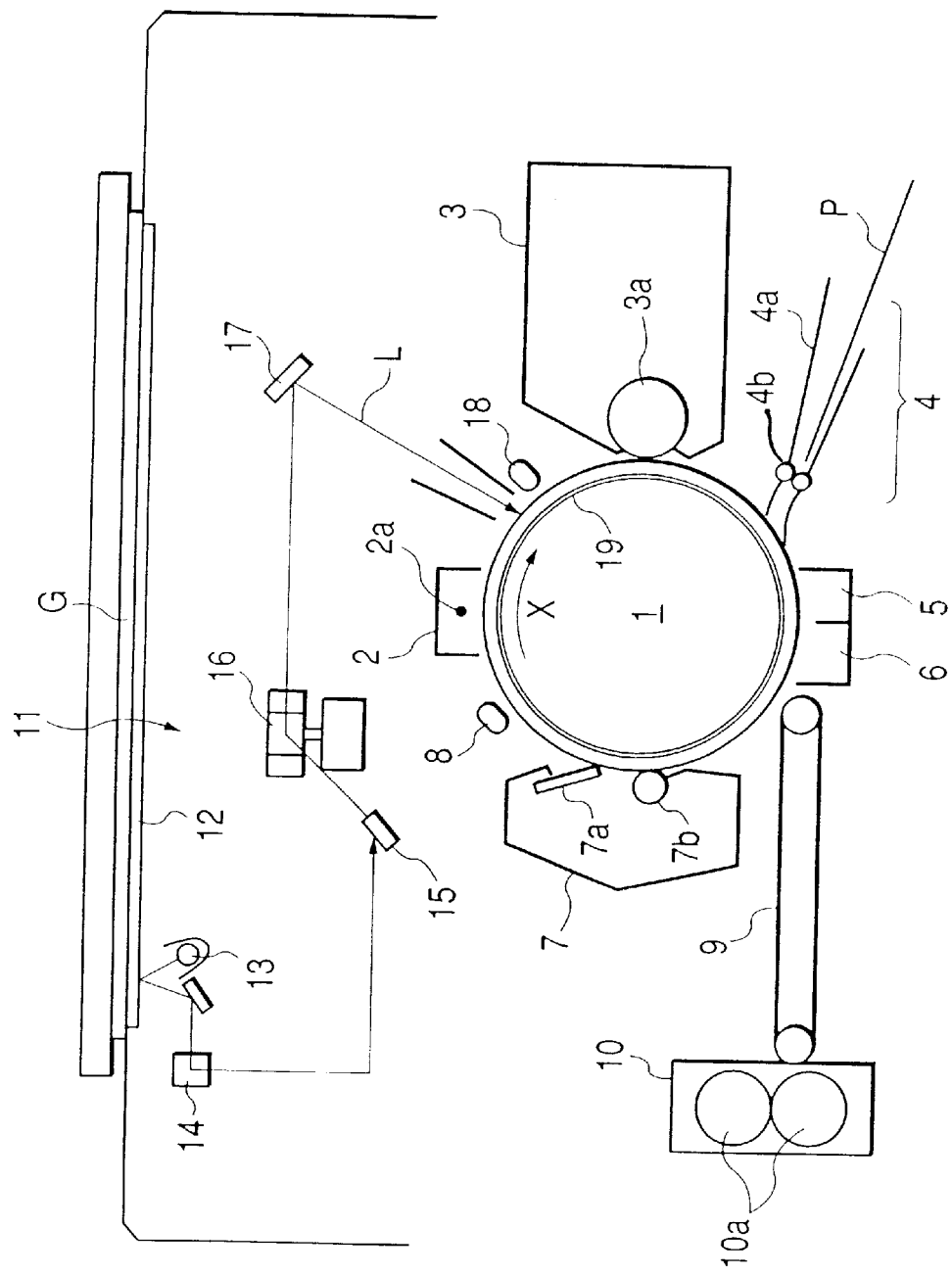
FIG. 1 is a schematic view showing the configuration of an embodiment of the image forming apparatus of the present invention.

FIG. 1 is a schematic view showing the configuration of an embodiment of the image forming apparatus of the present invention, constituting an electrophotographic copying apparatus employing a drum-shaped photosensitive member, namely a photosensitive drum 1.

Along the periphery of the photosensitive drum 1, there are provided a main charger 2 consisting of a corona charger, a potential sensor 18, a developing unit 3, a transfer sheet feed system 4, a transfer charger 5, a separation charger 6, a cleaner 7 and a charge eliminating light source 8. Obliquely below the photosensitive drum 1, there is provided a transfer sheet conveying belt 9, and a fixing unit 10 is provided on the extension thereof. A laser exposure optical system 11 is positioned above the photosensitive drum 1.

The exposure optical system 11 is provided with a lamp 13 for illuminating, in motion, an original G placed on an original glass stage 12 of the copying apparatus, an image processing unit 14 for processing the image represented by light reflected from the original G to generate a digital image signal corresponding to image information of the original G, a semiconductor laser 15 is driven by the digital image signal to generate a laser beam L corresponding to the image information, a polygon mirror 16 for deflecting the laser beam L from the laser 15, and a mirror 17 for reflecting the beam L toward the photosensitive drum 1, thereby irradiating the surface of the photosensitive drum 1.

For achieving image formation, the surface of the photosensitive drum 1 is uniformly charged by the main charger 2 and is irradiated by the laser beam L from the exposure optical system 3 to form an electrostatic latent image, corresponding to the image information, on the surface of the photosensitive drum 1. The photosensitive drum 1 is composed of a cylindrical conductive substrate and an a-Si photosensitive layer formed thereon. If necessary, a panel-shaped heater 19 may be provided inside the substrate 1a for controlling the temperature of the photosensitive drum 1 by heating from the inside. The latent image formed on the surface of the photosensitive drum 1 is developed in the developing unit 3 by toner supported on a developing sleeve 3a, thereby visualized as a toner image. The toner on the developing sleeve 3a and the photosensitive drum 1 are maintained in a non-contacting relationship, and a voltage obtained by superposing an AC voltage and a DC voltage is applied to the developing sleeve 3a to form an alternating electric field between the developing sleeve 3a and the photosensitive drum 1.

On the other hand, a transfer sheet P from an unrepresented sheet cassette is conveyed by the transfer sheet feed system 4 to the photosensitive drum 1. The transfer sheet feed system 4 is provided for example with a sheet guide 4a and a pair of registration rollers 4b. The transfer sheet P is guided by the guide 4a to the registration roller 4b and is supplied to the photosensitive drum 1 at a predetermined timing. The toner image formed on the photosensitive drum 1 is transferred onto the transfer sheet P by the function of the transfer charger 5.

The transfer sheet P, bearing the transferred toner image, is separated from the photosensitive drum 1 by the separation charger 6 and separating means such as an unrepresented separating finger, then is conveyed by the conveyor belt 9 to the fixing unit 10, and discharged from the image forming apparatus after the toner image is fixed to the transfer sheet P by a pair of fixing rollers 10a of the fixing unit 10.

After toner image transfer from the photosensitive drum 1, substances deposited thereon, such as toner remaining after an image transfer operation, and paper dust, are eliminated by a cleaning member such a blade 7a or a roller (or brush) 7b of cleaner 7, and the drum surface is flush exposed to the light by the charge eliminating light source 8 to eliminate charge remaining on the surface, thereby preparing the photosensitive drum for the next image formation operation.

Figure 2:
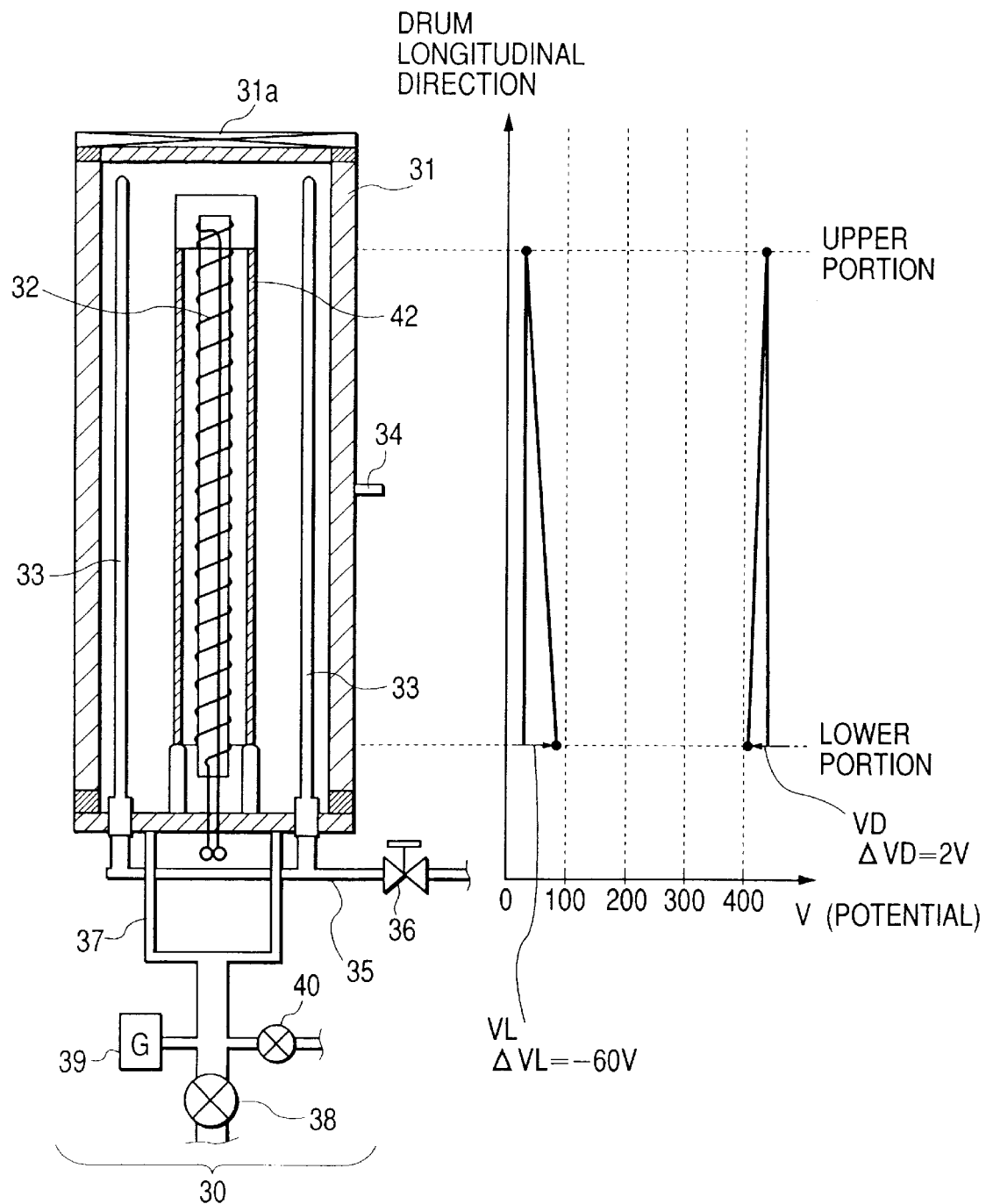
FIG. 2 is a view showing a PCVD apparatus employed in the embodiment shown in FIG. 1, and an example of unevenness in the characteristics of a photosensitive member produced by such apparatus.

In the present embodiment, the photosensitive drum 1 is provided with an a-Si photosensitive layer prepared by a high-frequency plasma CVD (PCVD) method. The PCVD apparatus employed in the present embodiment is shown in FIG. 2 and is a general apparatus employed in the manufacture of the electrophotographic photosensitive member. The PCVD apparatus is provided with a deposition device 30, and a raw material gas supply device and a gas discharge device (both not shown).

The deposition device 30 is provided with a reaction chamber 31 consisting of a vertical vacuum container, around which there are provided plural raw material gas introducing pipes 33 in the vertical direction. On the lateral face of the gas introducing pipe 33, there are provided a plurality of fine holes along the longitudinal direction thereof. At the center of the reaction chamber 31, there is vertically provided a heater 32 formed as a spiral coil. A cylindrical member 42 constituting the substrate of the photosensitive drum 1 is inserted into the chamber 31 by opening an upper cover 31a and is vertically set in the chamber 31, with the heater 32 at the center. High-frequency electric power is supplied from a projection 34 provided at a lateral face of the reaction chamber 31.

In the lower part of the reaction chamber 31, raw material gas supply pipes 33 are mounted and connected through a supply valve 36 to a gas supply device (not shown). Also under the reaction chamber 31 there is provided a gas discharge pipe 37, which is connected through a main discharge valve 38 to an unrepresented discharge device (vacuum pump). The discharge pipe 37 is also provided with a vacuum gauge 39 and a sub discharge valve 40.

The a-Si photosensitive layer is formed in the following manner, by a high-frequency PCVD method employing the above-described apparatus. At first the cylindrical substrate 42 of the photosensitive drum 1 is set in the reaction chamber 31. After the cover 31a is closed, the interior of the reaction chamber 31 is evacuated by a discharge device (not shown) to a predetermined pressure or lower, and the substrate is heated from the inside by the heater 32 to maintain the substrate 42 at a predetermined temperature within a range of 20° to 450° C., while the evacuation is continued. While the substrate 42 is maintained at the predetermined temperature, desired raw material gasses are introduced, under adjustment of the flow rates by respective flow rate controllers (not shown), into the reaction chamber 31 through the supply pipes 33. The introduced raw material gasses, after filling the interior of the reaction chamber 31, flow toward the bottom thereof and are discharged therefrom through the discharge pipe 37.

When it is confirmed, by the vacuum gauge 39, that the interior of the reaction chamber 31 filled with the raw material gasses is stabilized at a predetermined low pressure, a high frequency signal (13.56 MHz) is introduced with a desired power from a high frequency power source (not shown) into the chamber 31 to generate glow discharge therein. The energy of the glow discharge decomposes the components of the raw material gas to generate plasma ions, which are attracted to and deposited onto the surface of the substrate 42 while flowing toward the bottom of the chamber 31, thereby forming an a-Si deposition layer principally composed of silicon on the surface of the substrate 42.

When the a-Si deposition layer is formed with a desired thickness on the surface of the substrate 42, the supply of the high frequency electric power is terminated, and the supply valve 36, etc., are closed to terminate the introduction of the raw material gas into the reaction chamber 31, whereby the formation of an a-Si deposition layer is completed. The process is similarly repeated plural times to form an a-Si deposition layer of a desired multi-layered structure constituting an a-Si photosensitive layer, thereby obtaining a photosensitive drum 1 having an a-Si photosensitive layer of a multi-layered structure on the surface of the substrate 42.

In the above-described process, it is possible to control the electrophotographic characteristics of the a-Si deposition layer along the longitudinal direction (vertical direction) of the substrate 42, by adjusting the flow rate distribution, in the longitudinal direction of the supply pipes 33, of the raw material gas introduced from the fine holes distributed along the longitudinal direction of the supply pipes 33 into the reaction chamber 31, the flow rate of the used gas from the the discharge pipe 37, discharge energy, etc.

In order to clarify variation in the dot diameter of the image during development, namely the relationship between the dot diameter reproducibility during latent image development and the variation in image density, the potential of a latent dot image was measured and the dot diameter of the latent image was determined from the potential distribution of the dot.

Figure 3:
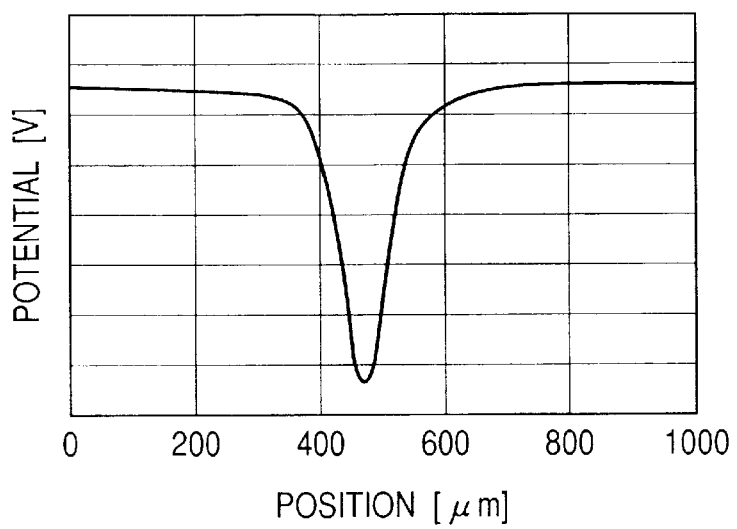
FIG. 3 is a chart showing the potential distribution, measured by a potential sensor, of a latent dot image in an a-Si photosensitive drum of the present invention.

After the a-Si photosensitive drum was charged, a latent image was formed by laser exposure of a line and the potential of a latent dot image was precisely measured with a potential sensor 18 as disclosed in the Japanese Patent Application Laid-Open No. 3-296073. The obtained result is shown in FIG. 3. The dot diameter of the latent image can be determined by analyzing the shape of the potential distribution of such latent dot image.

The investigation of the present inventors, executed by giving digital exposures under a same condition to a photosensitive member showing unevenness in characteristics, more specifically unevenness of potential in the dark portion and in the light portion, revealed that such unevenness did not significantly affect the latent dot diameter.

Then, in order to clarify variation in the dot diameter in the developed image, namely the relationship between reproducibility of the dot diameter by latent image development and variation in the image density, the diameter of the dot after development was measured under an optical microscope while the dot diameter in the latent image level was maintained constant.

Figure 4:
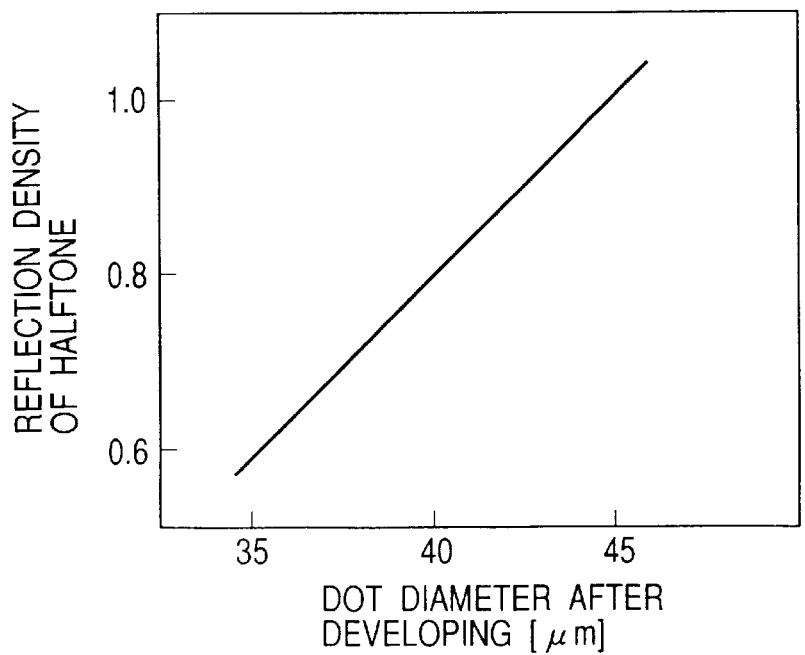
FIG. 4 is a chart showing the relationship between the reproducibility of the dot diameter in the development and the image density.

FIG. 4 shows the relationship between the density of a halftone image and the dot diameter, obtained by alternating a dot and a space (turning on the laser for a line and turning off the laser for a line) at 600 dpi (latent dot image diameter of 40 to 50 $\mu$m) varying the developed dot diameter by changing the conditions of development. As shown in FIG. 4, in order to obtain a predetermined density in the halftone image, the reproducibility of the dot diameter in the development is extremely important.

Therefore, in order to achieve uniformity in the dot diameter during development, thereby realizing uniformity in the halftone image while maintaining the density thereof, the present inventors tried to control the dot diameter after development by adjusting the balance between the difference Vcont between the light potential (potential of light portion) and the DC component of the developing bias and the difference Vback between the dark potential (potential of dark portion) and the DC component of the developing bias. As a result, although it has been regarded that the uniformity of the dark potential is the governing factor on the uniformity of image density during normal development and that the uniformity of the light potential is the governing factor on the uniformity of image density during reversal development, the present inventors found that, during reverse development, the image density varies in inverse proportion to the slope of the dark potential when the SD gap between the photosensitive drum 1 and the developing sleeve 4a is narrow.

It is therefore possible to attain a high image density, satisfactory dot reproducibility and a uniform image density by selecting a narrow SD gap, a gradually sloped dark potential and a inversely gradually sloped light potential.

Such finding will be explained in more detail with reference to FIGS. 5 and 6, which show a mechanism for obtaining uniform image density in the present invention. In FIGS. 5 and 6, the abscissa indicates the position in the longitudinal direction of the photosensitive drum 1, in which the starting point (0 mm) is selected at the center.

Referring to FIG. 5, the surface of the photosensitive drum 1 is uniformly charged to a dark potential VD by the main charger 2 having a charging wire 2a of a uniform height in the longitudinal direction of the drum 1 and a latent image of a halftone image is formed with a light potential VL on the surface of the photosensitive drum 1. In such situation, if the light potential VL is significantly inclined in the longitudinal direction of the drum 1, for example smaller at the left hand side and larger at the right hand side thereof, where the maximum difference $\Delta$VL in the light portion is as large as 72 V, while the maximum difference $\Delta$VD in the dark portion is as small as 18 V, there will result a large difference in the developing contrast (difference between the light potential VL and the dark potential VD) because of the influence of the sloped light potential VL on the photosensitive drum 1. As a result, the amount of toner deposited onto the photosensitive drum 1 during development becomes larger at the left hand side and smaller at the right hand side, whereby the density of the obtained halftone image shows a difference as large as 0.56 between the left hand end and the right hand end. The SD gap between the a-Si photosensitive drum 1 and the developing sleeve 3a is selected at 180 $\mu$m, and $V_{back}$ indicates the difference between the dark potential VD and the developing bias VDC.

Then, as shown in FIG. 6, the height of the charging wire 2a relative to the surface of the photosensitive drum 1 is sloped in the longitudinal direction thereof, to adjust the maximum difference $\Delta$VD of the dark potential VD at the left hand end with respect to that at the right hand end to +60 V, and to adjust the maximum difference $\Delta$VL of the light potential VL to −44 V, thereby obtaining a dark potential sloped significantly higher toward the left hand end in contrast to the light potential sloped lower toward the left hand end. As a result, the voltage $V_{back}$, suppressing toner jump from the photosensitive drum 1 to the developing sleeve 3a, becomes stronger at the right hand side and weaker at the left hand side, whereby the amount of toner jumping to the photosensitive drum 1 and the amount of toner returning therefrom to the developing sleeve 3a are well balanced over the longitudinal direction of the photosensitive drum 1, reducing the density difference between the left and right ends to as small as 0.2. Consequently the density difference in the halftone image can be reduced within a range of 0.2 and the uniformity in the density of the halftone image can be significantly improved. In the foregoing, the charging wire 2a is inclined so as to be positioned lower toward the right hand end.

The above-described effect can be clearly exhibited in the case when the maximum difference $\Delta$VL in the light potential VL in the longitudinal direction of the photosensitive drum 1 is 100 V or lower and the maximum difference $\Delta$VD in the dark potential VD is 20 V or higher. The SD gap in the present embodiment is preferably 150 $\mu$m or more in order to achieve non-contact development, but it should preferably not exceed 230 $\mu$m, because, when the gap is excessively wide (exceeding 230 $\mu$m), the suppressing effect for toner jump by the dark potential is weak even if the dark potential is adjusted by the charging wire.

It is thus possible to reduce the density difference in a halftone image in the longitudinal direction of the photosensitive drum 1, by forming inverse slopes in the light potential VL and in the dark potential VD on the photosensitive drum 1, thereby compensating the variation in Vcont with $V_{back}$. In reverse development, the image density is not determined solely by Vcont but is also affected by $V_{back}$ which exhibits the toner returning effect from the photosensitive member to the developing sleeve, and unevenness in the density is influenced by unevenness in the light potential VL as well as by unevenness in the dark potential VD.

Now, in the image area (coming into contact with the transfer sheet) on the surface of the photosensitive drum 1, there are considered the maximum potential difference $\Delta$VD [volt] (sign being taken into consideration) in the dark potential VD in a direction (for example from right to left) of the longitudinal length of the photosensitive drum 1, the maximum potential difference $\Delta$VL in the light potential VL, the density variation a [1/volt] per unit dark potential difference in the image obtained by developing the area of the light potential VL, and the density variation b [1/volt] per unit light potential difference.

Thus, the density difference in the longitudinal direction of the photosensitive drum 1 can be represented by a×$\Delta$VD+ b×$\Delta$VL. In a halftone image, the density difference should not exceed about 0.3 in order that image unevenness is not conspicuous, so that the maximum difference in the reflective density of the image should satisfy a condition:

$$-0.3 \leq a \times \Delta VD + b \times \Delta VL \leq 0.3$$

wherein 100 V$\geq$|$\Delta$VD|$\geq$20 V and 100 V$\geq$|$\Delta$VL|$\geq$20 V.

In the foregoing description, the density variations a, b are defined in the following manner.

The density is defined by the reflective density employed in the photographic and printing fields. The reflective density is represented by a logarithmic number based on 10 and representing the reciprocal of the reflectance. The densitometer employed was a Macbeth RD-915 (Electrophotography-Bases and Applications, Society of Electrophotography of Japan, Jun. 15, 1988, p. 724 published by Corona Publishing Co., Ltd.).

The potential difference was measured with a surface potential meter such as #344 (manufactured by TREK Inc.) and is represented in volts.

More specifically, the density variation "a" per unit dark potential difference is determined in the following manner.

After the height adjustment of the charging wire of the corona charger, the maximum potential difference $\Delta$VD (V) of the dark potential and the density difference (difference in Macbeth reflective density/absolute number) of a halftone image of an image density of 50% (1 dot–1 space) are measured, and the value "a" is obtained by dividing the Macbeth reflective density by the potential difference.

Similarly, after the height adjustment of the charging wire of the corona charger, the maximum potential difference ΔVL (V) of the light potential and the density difference (difference in Macbeth reflective density/absolute number) of a halftone image of an image density of 50% (1 dot–1 space) are measured, and the value "b" is obtained by dividing the Macbeth reflective density by the potential difference.

In the present embodiment, in order to satisfy the aforementioned relation, the following characteristics are adjusted in advance: (1) the charging ability of the main charger 2 (by the adjustment of height of the wire 2a) in the longitudinal direction thereof (same as the longitudinal direction of the photosensitive drum 1), and (2) at least one of the charging characteristics by the main charger 2 and the sensitivity characteristics to the laser exposure L in the photosensitive member manufacturing process, in the longitudinal direction of the surface of the photosensitive drum 1.

In the following, the present invention will be further clarified by specific examples, but the present invention is by no means limited by such examples.

Embodiment 1

The PCVD apparatus shown in FIG. 2 was used to deposit a-Si on a conductive substrate, thereby to form an a-Si photosensitive layer consisting of a charge inhibition layer, a photoconductive layer and a surfacial layer, all composed of a-Si deposition films. Under uniform charging by the corona charger, the a-Si photosensitive layer showed a larger slope in the charging ability of the dark portion and a smaller slope in the charging ability of the light portion, as shown in FIG. 2, in the longitudinal direction (axial direction) of the photosensitive drum, both in unevenness, both slopes being inclined in mutually opposite directions. Film forming conditions for a-Si photosensitive layer were as follows: Charge inhibition layer

| Raw material gas | $SiH_4$ | 300 sec |
| --- | --- | --- |
|  | $H_2$ | 500 sec |
|  | NO | 8 sec |
|  | $B_2H_6$ | 200 ppm |
| Electric power | 100 W (13.56 MHz) | |
| Internal pressure | 53.2 Pa (0.4 Torr) | |
| Film thickness | 1 μm | |
| Substrate temperature | 250° C. | |
| Photoconductive layer | | |
| Raw material gas | $SiH_4$ | 500 sec |
|  | $H_2$ | 500 sec |
| Electric power | 400 W (13.56 MHz) | |
| Internal pressure | 26.6 Pa (0.2 Torr) | |
| Film thickness | 25 μm | |
| Surfacial layer | | |
| Raw material gas | $SiH_4$ | 10 sec |
|  | $H_2$ | 500 sec |
| Electric power | 150 W (13.56 MHz) | |
| Internal pressure | 39.9 Pa (0.3 Torr) | |
| Film thickness | 0.6 μm | |

In this example, the a-Si photosensitive drum mentioned above was mounted on a modified copying machine NP-6060 (with a process speed of 300 mm/sec) (manufactured by Canon Inc.). A latent image was formed by imagewise binary laser exposure of 600 dpi (dot size 40×45 μm) and was reverse developed with positive non-magnetic toner under various SD gaps, and each obtained toner image was transferred and fixed on the transfer sheet to obtain a solid black image thereon. The density of the solid black image was measured with a reflective densitometer (Macbeth RD-914), and the dot constituting the solid black image was observed under an optical microscope (STM-UM manufactured by Olympus Optical Co., Ltd.).

Figure 7:
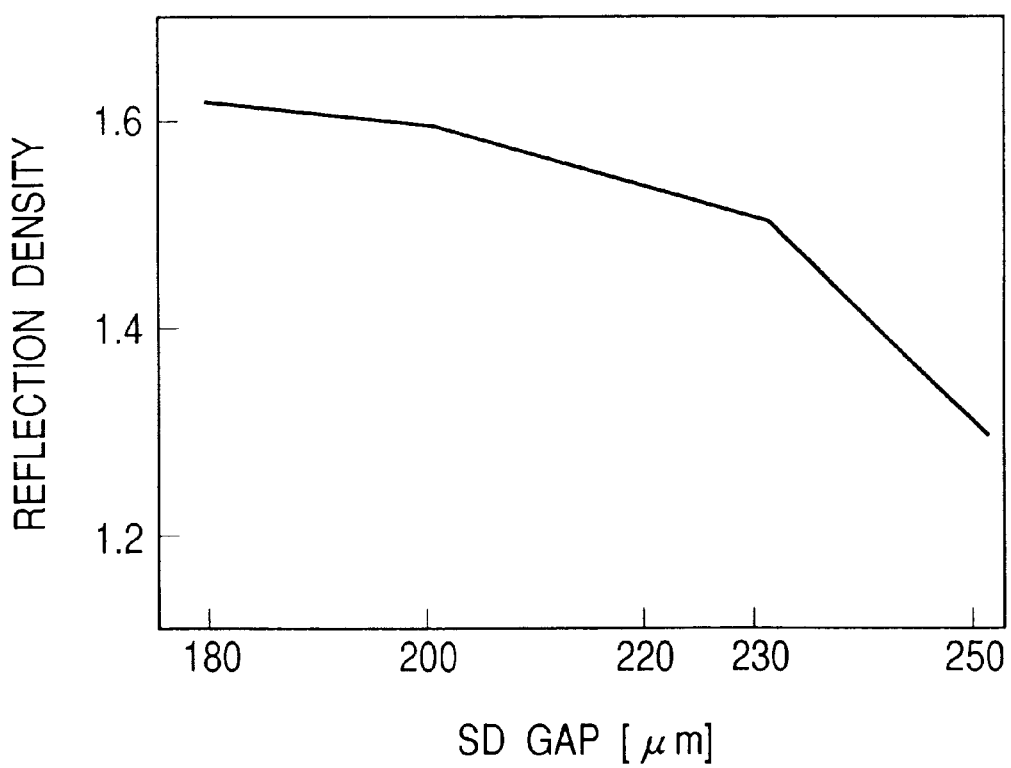
FIG. 7 is a chart showing the relationship between an SD gap in an embodiment of the present invention and the solid black image density.

FIG. 7 shows the relationship between the SD gap and the reflective density of the obtained solid black image. As shown in FIG. 7, the density of the solid black image showed a steeper decrease when the SD gap exceeded 230 μm. It is therefore preferable to maintain the SD gap at 230 μm or smaller. Also the dot observation under the microscope showed satisfactory correlation between dot diameter reproducibility during development and image density.

Figure 8A:
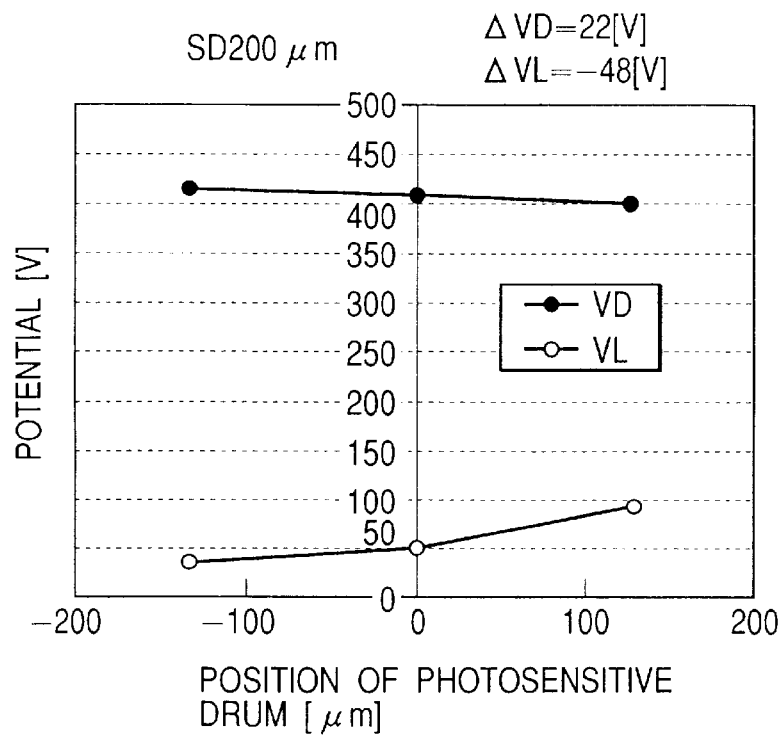
FIGS. 8A and 8B are charts showing the relationship between variations in the dark potential ΔVD and the light potential ΔVL in the longitudinal direction of the photosensitive drum and the variation in the image density in an embodiment of the present invention.
Figure 8B:
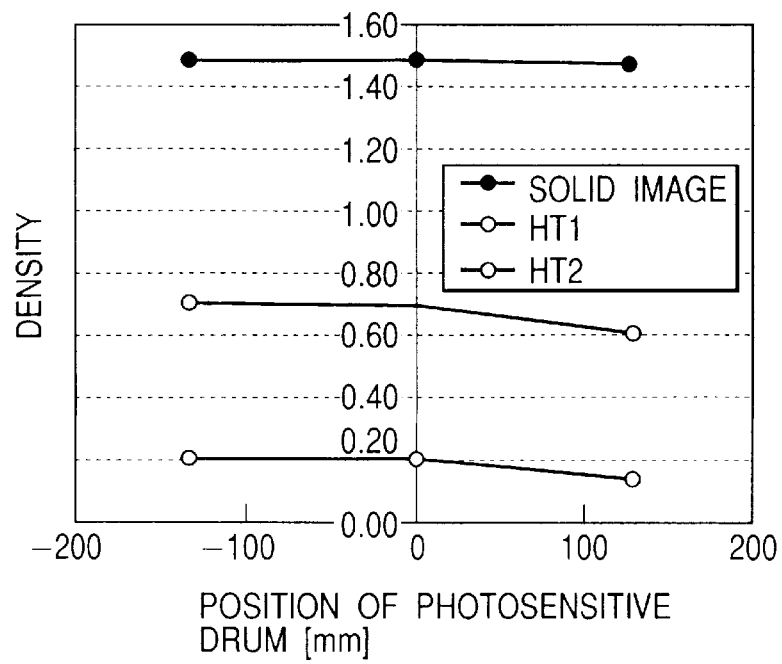

Then a solid black image and a halftone image were formed in a similar manner with the SD gap at 200 μm. FIGS. 8A and 8B show the relationship between the variations in the dark potential VD and the light potential VL in the longitudinal direction of the photosensitive drum and the variation in the image density.

FIG. 8A shows the variations in the dark potential VD and the light potential VL in the case where the photosensitive member shown in FIG. 2, having the potential differences ΔVD=2 V and ΔVL=−60 V under the uniform charging was adjusted so as to have maximum potential differences ΔVD=+22 V and ΔVL=−48 V, respectively, in the dark and light potentials, wherein the signs of these values are determined according to the aforementioned definition. FIG. 8B shows the variation in the image density, wherein HT1 indicates a halftone image of repeating 1 dot and 1 space (image density 50%), while HT2 indicates a halftone image of a density of 25% by increasing the space area.

In the present example, as shown in FIGS. 8A and 8B, the dark potential VD is varied so as to have a slope inverse to that of the light potential VL, and it is rendered possible to improve the uniformity of the halftone image while maintaining high density not only in the solid black image but also in the halftone image. Also the observation under the microscope showed satisfactory correlation between the dot reproducibility in development and the image density.

Embodiment 2

Figure 9A:
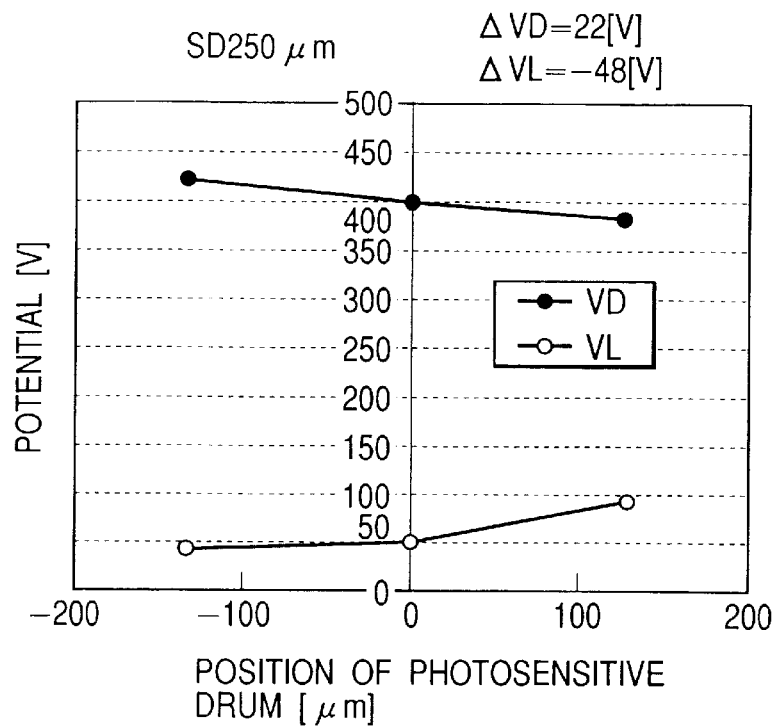
FIGS. 9A and 9B are charts showing the relationship between variations in the dark potential VD and the light potential VL in the longitudinal direction of the photosensitive drum and variation in the image density in a comparative example.
Figure 9B:
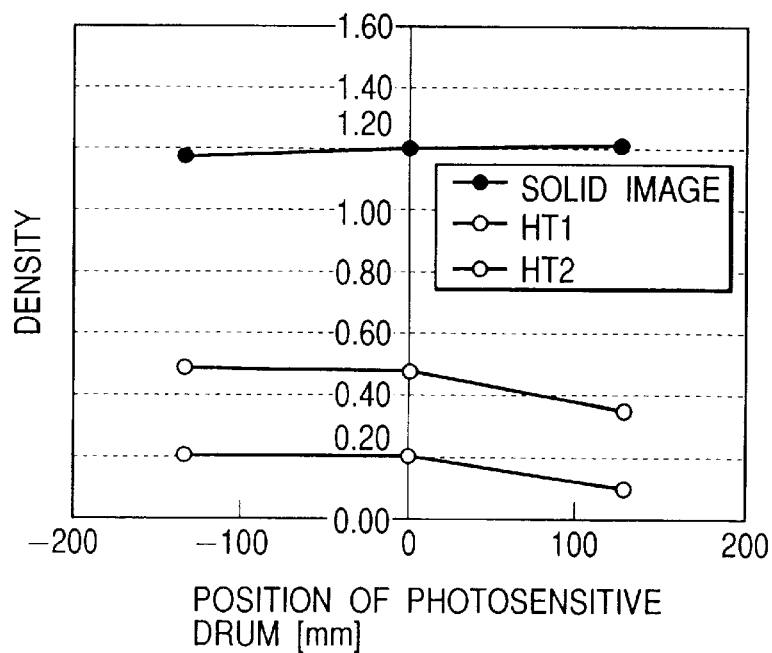

Embodiment 1 was reproduced except that the SD gap was selected as 250 μm, and the obtained results are shown in FIGS. 9A and 9B. FIG. 9A shows variations in the dark potential VD and the light potential VL under the same conditions as in Embodiment 1, as shown in FIG. 8A, namely ΔVD=+22 V and ΔVL=−48 V. FIG. 9B shows variation in the image density, wherein HT1 indicates a halftone image of repeating 1 dot and 1 space (image density 50%), while HT2 indicates a halftone image of a density of 25 % by increasing the space area.

As shown in FIGS. 9A and 9B, uniformity of the halftone image could be attained, though the density of the solid black image and the halftone image was generally lower than in the embodiment shown in FIGS. 8A and 8B.

What is claimed is:

1. An electrophotographic apparatus comprising:
a photosensitive member, said photosensitive member showing difference in charging characteristic or in sensitivity characteristic in a longitudinal direction thereof;
electrostatic image forming means for forming an electrostatic image on said photosensitive member, said electrostatic image forming means including charging means for charging said photosensitive member and exposure means for exposing said photosensitive member, charged by said charging means, according to an image signal; and development means for reverse development of said electrostatic image with a developer;

wherein maximum potential difference $\Delta VD$ (volt) in a potential of a dark portion of the electrostatic image in the longitudinal direction, maximum potential difference $\Delta VL$ in a potential of a light portion of the electrostatic image in the longitudinal direction, a value a (1/volt) represented by (variation amount in density, in the longitudinal direction, in the image formed by developing the light portion with said developing means)/(the maximum potential difference $\Delta VD$) and a value b (1/volt) represented by (variation amount in density, in the longitudinal direction, in the image formed by developing the light portion with said developing means)/(said maximum potential difference $\Delta VL$) satisfy a relation:

$$-0.3 \leq a \times \Delta VD + b \times \Delta VL \leq 0.3$$

in which $100 \geq |\Delta VD| \geq 20$ and $100 \geq |\Delta VL| \geq 20$.

2. An electrophotographic apparatus according to claim 1, wherein said exposure means exposes said photosensitive member by a laser light.

3. An electrophotographic apparatus according to claim 1, wherein said charging means is a corona discharge device.

4. An electrophotographic apparatus according to claim 1, wherein the developer has an average particle diameter within a range of 6 to 9 $\mu$m.

5. An electrophotographic apparatus according to claim 1, wherein said developing means includes a developer bearing member for bearing developer and is adapted to execute a developing operation with a gap between developer borne by said developer bearing member and said photosensitive member.

6. An electrophotographic apparatus according to claim 5, wherein the gap between said photosensitive member and said developer bearing member is within a range of 150 to 230 $\mu$m.

7. An electrophotographic apparatus according to claim 1, wherein a charging ability of said charging means is different in the longitudinal direction.

8. An electrophotographic apparatus according to claim 7, wherein said charging means is a corona discharge device including a wire electrode and a distance between said wire electrode and said photosensitive member varies in the longitudinal direction.

9. An electrophotographic apparatus according to claim 1, wherein said photosensitive member includes a substrate and an amorphous silicon photosensitive layer provided thereon, and said amorphous silicon photosensitive layer is formed on a surface of said substrate by a decomposition reaction of a silicon generating gas, in a state in which said substrate stands vertically in a reaction chamber with gas discharge from a lower part thereof.

10. An electrophotographic apparatus according to claim 9, wherein said amorphous silicon photosensitive layer is formed by plasma CVD.

\* \* \* \* \*

UNITED STATES PATENT AND TRADEMARK OFFICE
CERTIFICATE OF CORRECTION

PATENT NO. : 6,169,868 B1
DATED : January 2, 2001
INVENTOR(S) : Koji Yamazaki, et al.

It is certified that error appears in the above-identified patent and that said Letters Patent is hereby corrected as shown below:

Column 1,
Line 12, "spread" should read -- the spread --.
Line 43, "and" should be deleted.

Column 2,
Line 48, "sub micron" should read -- sub-micron --.

Column 3,
Line 45, "the" (both occurrences) should be deleted.

Column 5,
Line 38, "sub discharge" should read -- sub-discharge --.

Column 6,
Line 22, "discharge" should read -- the discharge --.

Column 7,
Line 15, "a" should read -- an --.

Signed and Sealed this

Sixth Day of November, 2001

Attest:

NICHOLAS P. GODICI
*Attesting Officer*   *Acting Director of the United States Patent and Trademark Office*